United States Patent Office 3,104,245
Patented Sept. 17, 1963

3,104,245
16α-METHYL-5β-PREGNANE-11,20-DIONES AND DERIVATIVES THEREOF
Robert Joly, Montmorency, Seine-et-Oise, Julien Warnant, Neuilly-sur-Seine, and Bernard Goffinet, Paris, France, assignors, by mesne assignments, to Roussel-UCLAF, S.A., Paris, France, a corporation of France
No Drawing. Filed July 10, 1961, Ser. No. 122,663
Claims priority, application France July 27, 1960
4 Claims. (Cl. 260—397.45)

The invention relates to the novel compounds having the formula

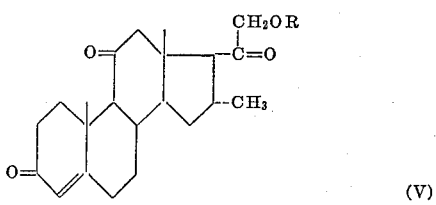

(V)

wherein R is selected from the group consisting of hydrogen, an acyl radical of a mineral acid and an acyl radical of an organic carboxylic acid having 1 to 18 carbon atoms. The invention further relates to novel processes for the preparations of compounds of Formula V and novel intermediates therefor.

16α-methyl-17-desoxy-cortisone and its esters are useful therapeutic agents possessing anti-inflammatory and glucocorticoidal activity. The compounds of the invention are also useful intermediates in the synthesis of other 16α-methyl corticosteroids such as pregnadiene having the formula

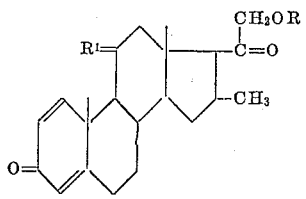

wherein R is selected from the group consisting of hydrogen, an acyl radical of a mineral acid and an acyl radical of an organic carboxylic acid having 1 to 18 carbon atoms and $R^1$ is selected from the group consisting of =O and

which are described in the commonly assigned, copending application Serial No. 124,248, filed May 3, 1961. These pregnadienes are useful for increasing the elimination of sodium while only slightly increasing the elimination of potassium.

The formation of the said pregnadianes is effected by dehydrogenation of 16α-methyl-17-desoxy-cortisone or its esters with a chemical dehydrogenation agent such as selenium dioxide or 2,3-dicyano-5,6-dichloro-benzoquinone or with biological dehydrogenation ferments secreted by microorganisms such as Corynebacterium.

It is an object of the invention to provide the novel products, 16α-methyl-17-desoxy-cortisone and its esters.

It is another object of the invention to provide novel processes for the preparation of 16α-methyl-17-desoxy-cortisone and its esters.

It is an additional object of the invention to provide novel intermediates for the preparation of 16α-methyl-17-desoxy-cortisone and its esters.

These and other objects and advantages of the invention will become obvious from the following detailed description.

The compounds of the invention have the formula

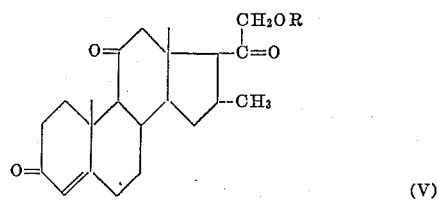

(V)

wherein R is selected from the group consisting of hydrogen, an acyl radical of a mineral acid and an acyl radical of an organic carboxylic acid having 1 to 18 carbon atoms.

The acyl radical of the organic carboxylic acid having 1 to 18 carbon atoms may be derived from an aliphatic, aromatic, cycloaliphatic or heterocyclic carboxylic acid. Examples of suitable acids are alkanoic acids such as formic acid, acetic acid, propionic acid, butyric acid, isobutyric acid, valeric acid, isovaleric acid, trimethyl acetic acid, caproic acid, β-trimethyl propionic acid, heptanoic acid, caprylic acid, pelarginic acid, capric acid, undecylic acid, lauric acid, myristic acid, palmitic acid and stearic acid; alkenoic acids such as undecylenic acid and oleic acid; cycloalkyl carboxylic acids such as cyclopentyl carboxylic acid, cyclopropyl carboxylic acid, cyclobutyl carboxylic acid and cyclohexyl carboxylic acid; cycloalkyl alkanoic acids such as cyclopentyl acetic acid, cyclohexyl acetic acid, cyclopentyl propionic acid and cyclohexyl propionic acid; arylalkanoic acids such as phenyl acetic acid and phenyl propionic acid; aryl carboxylic acids such as benzoic acid and 2,4-dinitrobenzoic acid; phenoxy alkanoic acids such as phenoxy acetic acid, p-chlorophenoxy acetic acid, 2,4-dichlorophenoxy acetic acid, 4-ter-butylphenoxy acetic acid, 3-phenoxy propionic acid and 4-phenoxy butyric acid; heterocyclic carboxylic acids such as furane-2-carboxylic acid, 5-ter-butylfurane-2-carboxylic acid, 5-bromofurane-2-carboxylic acid and nicotinic acids; β-ketoalkanoic acids, such as acetylacetic acid, propionylacetic acid and butyrylacetic acid; amino acids such as diethylaminoacetic acid and aspartic acid. Examples of other suitable acids are sulfonic acids, phosphoric acid and sulfuric acid.

One of the processes of the invention to produce 16α-methyl-17-desoxy-cortisone and its esters comprises subjecting 21-acyloxy-16α-methyl-5β-pregnane-3α-ol - 11,20-dione at temperatures about 20° to 30° C. to bromoxidation with an N-bromoamide or an N-bromoimide in a polar solvent such as a N,N-dilower alkyl lower alkanoic acid amide to form 4β-bromo-21-acyloxy-16α-methyl-5β-pregnane-3,11,20-trione, dehydrobrominating the latter to form 21-acyloxy-16α-methyl-Δ⁴-pregnene-3,11,20-trione, saponifying the latter to form 16α-methyl-17-desoxy-cortisone which can be esterified by the usual methods to form the desired esters.

A preferred mode of this process comprises reacting 21-acetoxy-16α-methyl - 5β - pregnane-3α-ol-11,20 - dione with N-bromosuccinimide in dimethylformamide to form 4β-bromo-21-acetoxy-16α-methyl-5β - pregnane - 3,11,20-trione, dehydrobrominating the latter with a mixture of lithium bromide and lithium carbonate in the presence of a N,N-dilower alkyl lower alkanoic acid amide to form 21-acetoxy-16α-methyl-Δ⁴-pregnene-3,11,20-trione, saponifying the said pregnene under alkaline conditions to form 16α-methyl-17-desoxy-cortisone which may be esterified.

Another process of the invention comprises oxidizing 21-acyloxy-16α-methyl-5β-pregnane-3α - ol - 11,20 - dione with chromic acid anhydride in an acid at low temperatures of about —5° to +5° C. to form 21-acyloxy-16α-methyl-5β-pregnane-3,11,20-trione, brominating the latter with bromine in a lower alkanoic acid such as acetic acid, at lower temperatures of about —10 to 0° C. to form 4β- bromo-21-acyloxy-16α-methyl-5β-pregnane - 3,11,20 - trione which is then dehydrobrominated and saponified as above to form 16α-methyl-17-desoxy-cortisone.

A third process of the invention comprises reacting under acidic conditions 21-acyloxy-16α-methyl-5β-pregnane-3α-ol-11,20-dione after oxidation of the 3-hydroxy-group with a lower alkyl orthoformate such as ethyl orthoformate in a lower alkanol at temperatures from 50° C. to reflux to form 21-acyloxy-3, 3-dilower alkoxy-16α-methyl-5β-pregnane-11,20-dione, heating the latter at elevated temperatures with or without an inert organic solvent such as toluene, xylene, tetraline or decaline to form 21-acyloxy-3-lower alkoxy-16α-methyl-Δ³-pregnene-11,20-dione, brominating the latter with bromine in an aqueous lower alkanol at room temperatures to form 4β - bromo - 21 - acyloxy - 16α - methyl - 5β - pregnane-3,11,20-trione which may be dehydrobrominated and saponified as above to form 16α-methyl-17-desoxy-cortisone. The processes of the invention are illustrated in Table I.

lowed by acyloxylation as described by Arth (J. Am. Chem. Soc., vol. 80, 1958, p. 3160).

The esterification of 16α-methyl-17-desoxy-cortisone may be effected with any of the usual esterification agents such acid halides or acid anhydrides of the desired acids.

Instead of saponifying the 21-acyloxy-16α-methyl-Δ⁴-pregnene-3,11,20-triones to form 16α-methyl-17-desoxy-cortisone, the esters may be subjected to alcoholysis with methanol in the presence of sodium methylate.

In the following examples there are described several preferred embodiments to illustrate the invention. However, it should be understood that the invention is not intended to be limited to the specific embodiments.

EXAMPLE I

*Preparation 4β-Bromo-21-Acetoxy-16α-Methyl-5β-Pregnane-3,11,20-Trione III by Bromoxidation of 21-Acetoxy - 16α - Methyl - 5β - Pregnane - 3α - Ol-11,20-Dione I*

90 gm. of 21-acetoxy-16α-methyl-5β-pregnane-3α-ol-11,

TABLE I

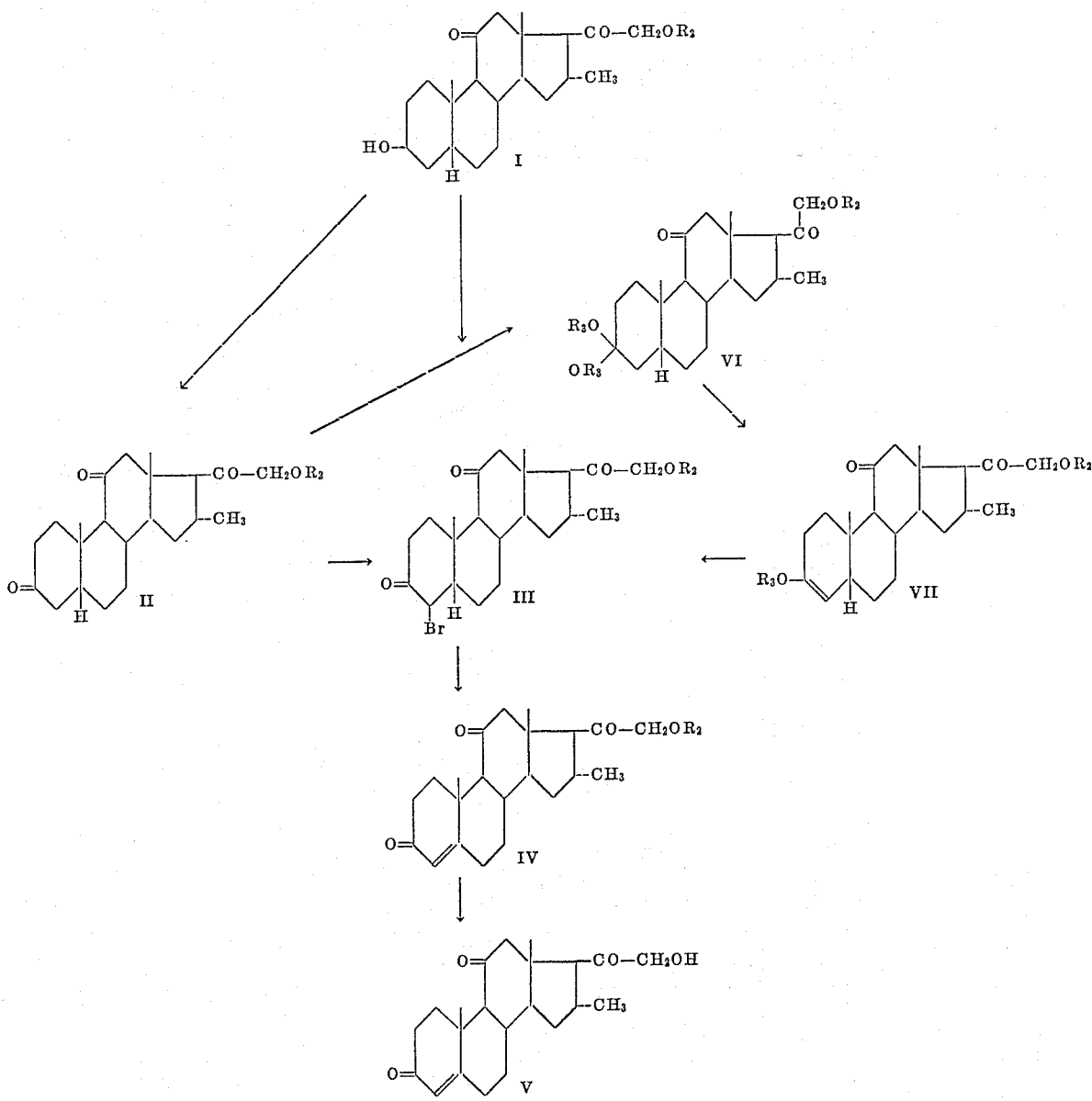

wherein $R_2$ is an acyl radical of an organic carboxylic acid having 1 to 18 carbon atoms and $R_3$ is a lower alkyl.

The starting material, 21-acyloxy-16α-methyl-5β-pregnane-3α-ol-11,20-dione, can be prepared by 21-bromination of 16α-methyl-5β-pregnane-3α-ol-11,20-dione fol- 20-dione were dissolved in 900 cc. of dimethylformamide. The solution was brought to about 25° C. and refrigerated in such a manner as to maintain this temperature constant and 87 gm. of N-bromosuccinimide were added under mechanical agitation over a 15 minute period. After the addition, the red reaction mixture has agitated for several minutes more, and then heated to 40°±1°. 0.9 cc. of hydrobromic acid added and the temperature was maintained at 40° C. until complete decoloration and disappearance of bromine (reaction to starch iodine paper). This required about three-quarters of an hour.

The solution obtained was poured into a mixture of water and ice and the precipitate formed was vacuum filtered and washed with water until the disappearance of halides in the wash water. After vacuum filtration and recrystallization from benzene, followed by desolvation by dissolution in isopropyl ether, there were obtained 74.6 gm. of 4β-bromo-21-acetoxy-16α-methyl-5β-pregnane-3,11,20-trione testing 16.8 to 17% bromine (theory: 16.6%) and having a specific rotation $[\alpha]_D^{20} = +115°$ to $+120°$ (c.=1% in chloroform).

This product is not described in the literature.

EXAMPLE II

*Preparation of 4β - Bromo - 21 - Acetoxy - 16α - Methyl-5β-Pregnane-3,11,20-Trione III by Oxidation Followed by Bromination of 21-Acetoxy-16α-Methyl-Pregnane-3α-Ol-11,20-Dione I*

62 grams of 21-acetoxy-16α-methyl-pregnane-3α-ol-11,20-dione in acetone was oxidized as described in the commonly assigned, copending patent application No. 124,248, filed May 3, 1961, by the action of 54 cc. of a solution obtained starting from 19.3 gm. of chromic anhydride, 16 cc. of concentrated sulfuric acid and 48 cc. of water at 0° C. After precipitation in water and washing, the product was purified by recrystallization from methylethylketone.

50 gm. of 21-acetoxy-16α-methyl-5β-pregnane-3,11,20-trione thus obtained were dissolved in 300 cc. of ethylene chloride. The solution was cooled to −5° C. and 0.5 cc. of concentrated hydrobromic acid was added. While maintaining the temperature at −5° C. there was added under agitation a solution of 20.4 gm. of bromine in 100 cc. of acetic acid containing 10 gm. of anhydrous sodium acetate. The sodium bromide precipitated in proportion to the addition and the absorption of bromine was terminated at about 1 hour. The reaction mixture was poured into a mixture of 100 gm. of sodium bicarbonate in 1 liter of water, agitated, decanted, and the aqueous phase was extracted by methylene chloride. The combined extracts were washed with water until neutral, dried over magnesium sulfate, filtered and evaporated to dryness. The white residue was taken up in 180 cc. of benzene and raised to the boiling point. The solvate with benzene crystallized after cooling. It was desolvated with isopropyl ether and compound III was obtained identical to that described in Example I.

EXAMPLE III

*Preparation of 4β-Bromo-21-Acetoxy - 16α - Methyl-5β-Pregnane-3,11,20-Trione III by Bromination of the Enol Ether VII*

STEP A.—PREPARATION OF 21-ACETOXY-3,3-DIETHOXY-16α-METHYL-5β-PREGNANE-11,20-DIONE VI 250 cc. of ethanol and 25 cc. of ethyl orthoformate were added to 50 gm. of 21-acetoxy-16α-methyl-5β-pregnane-3,11,20-trione and the mixture obtained was heated under mechanical agitation and a current of nitrogen to 70° C. 2.5 cc. of a 10% solution of p-toluene sulfonic acid in ethanol were added to it and the solution was maintained several minutes more at 70° C. Solution took place almost simultaneously and 3 to 5 minutes after solution, 2.5 cc. of pyridine were added. The reaction mixture was cooled to 10° C. and a precipitate was slowly caused by addition of ice water. 21-acetoxy-3,3-diethoxy - 16α - methyl-5β-pregnane-11,20-dione crystallized. After standing for one hour at −10° C., the precipitate was vacuum filtered, washed with water containing 1% of pyridine and dried. 57 grams (being a yield of 96%) of the raw compound sufficiently pure for its transformation in Step B were obtained.

For analysis, it was purified by recrystallization from boiling isopropyl ether containing 1% of pyridine. It had a melting point of 135° C. and a specific rotation $[\alpha]_D^{20} = +105°$ (c.=1% in pyridine). The product was very soluble in benzene and chloroform, soluble in alcohol and ether, very slightly soluble in acetone, insoluble in water.

*Analysis.*—$C_{28}H_{44}O_6$: molecular weight=476.63. Calculated: C, 70.55%; H, 9.31%. Found: C, 70.5%; H, 9.3%.

This compound is not described in the literature.

STEP B.—PREPARATION OF 21-ACETOXY-3-ETHOXY-16α-METHYL-Δ³-PREGNENE-11,20-DIONE VII 50 gm. of the compound prepared in Step A were introduced into 300 cc. of anhydrous toluene heated to 80° C. Solution was instantaneous. The solution was heated to the boiling point and over a period of 2 hours, 75 cc. of solvent was distilled. The temperature of distillation rose slowly to 107° C. 0.5 cc. of pyridine were then added to the clear yellow solution and the solution was evaporated to dryness under vacuum and under agitation. The oily residue was added to an equal volume of tertiary butyl alcohol and the solvent was distilled from it. The crystallized residue comprised 21-acetoxy-3-ethoxy-16α-methyl-Δ³-pregnene - 11,20 - dione sufficiently pure for bromination. The yield was 45 gm. (100%) and it had a melting point of 172° C.

For analysis, it was recrystallized from ethanol containing 1% pyridine. Its melting point was 175° C. and it had a specific rotation $[\alpha]_D^{20} = +151.5°$ (c.=1% in pyridine). It was very soluble in chloroform, soluble in acetone and benzene, soluble in hot alcohol, slightly soluble in ether and insoluble in water.

*Analysis.*—$C_{26}H_{38}O_5$: molecular weight=430.56. Calculated: C, 72.52%; H, 8.90%. Found: C, 72.4%; H, 9.1%.

This compound is not described in the literature.

STEP C.—TRANSFORMATION OF THE ENOL ETHER INTO THE 4α-BROMINATED KETONE III 33.5 gm. of sodium acetate, 670 cc. of tertiary butyl alcohol and 120 cc. of water were added to 44.6 gm. of the compound prepared in Step B under mechanical agitation. While maintaining the agitation, there were introduced in ratio to its absorption 55 cc. of a 10% solution of bromine in methanol while maintaining the temperature of the reaction mixture at about 25° C. 10/11 of the bromine was reacted in several minutes. The last eleventh did not seem to react. The solution was decolorized by the addition of 2.5 cc. of a concentrated solution of sodium bisulfite. The solution was added to water, agitated, vacuum filtered and the precipitate washed with water until neutral and disappearance of bromides from the wash water. After drying, 44.2 gm. being a yield of 88.2% of 4β-bromo-21-acetoxy-16α-methyl-5β-pregnane-3,11,20-trione, identical to that described in the preceding examples, were obtained. This product could be utilized as such for the dehydrobromination.

The products obtained by the three different methods are identical. Their rotatory power was +115 to +120° (c.=1% in chloroform) and had a melting point of 237° C.

EXAMPLE IV

*Preparation of 21-Acetoxy - 16 - Methyl-Δ⁴-Pregnene-3,11,20-Trione IV Starting From 4β-Bromo-21-Acetoxy-16α-Methyl - 5β - Pregnane-3,11,20-Trione*

72.5 gm. of lithium bromide and 72.5 gm. of lithium carbonate were added to 725 cc. of dimethylformamide and the mixture heated to 95° C. under a current of nitrogen while stirring. 72.5 gm. of 4β-bromo-21-acetoxy-16α-methyl - 5β - pregnane-3,11,20-trione were introduced into this mixture. The mixture was maintained for 18 hours at 95° C. under a current of nitrogen and agitation. Then the reaction mixture was poured into a mixture of 5 liters of water, 2 kg. of ice and 145 cc. of acetic acid. The reaction mixture was agitated for some time, vacuum filtered and the precipitate washed with water until the wash waters were neutral and the bromide disappeared. The raw 21-acetoxy - 16α - methyl-Δ⁴-pregnene-3,11,20-trione was dried and purified by crystallization from alcohol. The pure compound occurred in colorless prisms having a melting point of 200° C., and a specific rotation $[\alpha]_D^{20} = +226° \pm 2°$ (c.=1% in chloroform) was obtained. The ultraviolet spectra determined in solution in ethanol shows $\lambda_{max.}=238$ mμ, $\epsilon=15,600$.

The product was soluble in chloroform, quite soluble in benzene, soluble in 18 volumes of hot alcohol, slightly soluble in acetone and insoluble in water.

*Analysis.*—$C_{24}H_{32}O_5$: molecular weight=400.50. Calculated: C, 71.97%; H, 8.05%. Found: C, 72.1%; H, 7.9%.

This compound is not described in the literature.

EXAMPLE V

*Preparation of 16α-Methyl-Δ⁴-Pregnene-21-Ol-3,11-20-Trione V Starting From its Acetate IV*

10 gm. of the compound prepared in Example IV were introduced into 90 cc. of methanol. A current of nitrogen was passed therethrough. Then a solution of 5 gm. of sodium bicarbonate in 80 cc. of water was added. The mixture was agitated for a quarter of an hour, then boiled at reflux for a period of three-quarters of an hour. The mixture while still hot was acidified by addition of acetic acid until the pH reached between 5 and 6. The mixture was then cooled for a period of one hour to −10° C. 16α-methyl - Δ⁴ - pregnene-21-ol-3,11,20-trione crystallized.

It was vacuum filtered, and washed with 50% methanol. After recrystallization from ethanol, the pure product was obtained having a melting point of 199° C., and a specific rotation $[\alpha]_D^{20} = +225° \pm 3°$ (c.=0.5% in chloroform). The ultraviolet spectra, determined in ethanol, shows a $\lambda_{max.}=238$ mμ, $\epsilon=15,250$. It was soluble in chloroform, slightly soluble in benzene and acetone, soluble in 8 volumes of hot alcohol, very soluble in ether and insoluble in water.

*Analysis.*—$C_{22}H_{30}O_4$: molecular weight=358.48. Calculated: C, 73.71%; H, 8.43%. Found: C, 73.6%; H, 8.4%.

Various modifications of the processes of the invention may be made without departing from the spirit or scope thereof, and it is to be understood that the invention be limited only as defined in the appended claims.

We claim:
1. A compound having the formula

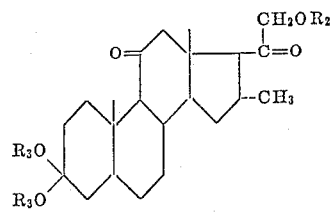

wherein $R_2$ is an acyl radical of an organic carboxylic acid having 1 to 18 carbon atoms and $R_3$ is a lower alkyl radical.

2. 21 - acetoxy - 3, 3 - diethoxy - 16α - methyl - 5β-pregnane-11,20-dione.

3. A compound having the formula

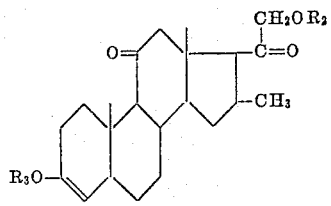

wherein $R_2$ is an acyl radical of an organic carboxylic acid having 1 to 18 carbon atoms and $R_3$ is a lower alkyl radical.

4. 21 - acetoxy - 3 - ethoxy - 16α - methyl - Δ³ - pregnene-11,20-dione.

References Cited in the file of this patent

UNITED STATES PATENTS 2,927,921   Oliveto et al. _____ Mar. 8, 1960

FOREIGN PATENTS 1,165,402   France _____ Oct. 24, 1958

OTHER REFERENCES

Wieland et al.: "Helvetica Chim. Acta (1960), No. 67–68, pp. 523–529 relied on.